Patented Oct. 16, 1951

2,571,706

UNITED STATES PATENT OFFICE 2,571,706

POLYVINYL ALCOHOL GELS

Donald E. Sargent, Easton, Pa., assignor to General Aniline & Film Corporation, New York, N. Y., a corporation of Delaware No Drawing. Application February 10, 1949, Serial No. 75,738

4 Claims. (Cl. 260—29.6)

The present invention relates to the preparation of reversible polyvinyl alcohol gels constituting inter alia, effective substitutes for gelatin in the preparation of silver halide emulsions.

As is well known, natural gelatin are almost universally employed as the protective colloid in photographic emulsions. Despite this fact, these natural products have serious shortcomings which have kindled a strong desire in the art for the creation of gelatin substitutes free from the objections to gelatin.

Among the shortcomings of gelatin are variability in physical properties and in chemical composition which lead to variations in the physical and photographic properties of the finished photographic emulsion and to variations in the susceptibility of the silver halides thereof to sensitizing and desensitizing substances, developing agents, and the like; brittleness when dry yielding photographic products, the emulsion layers of which crack rather easily, particularly in printing papers; low resistance to the action of bacteria and molds; susceptibility to the action of strongly alkaline or acid reagents; low "melting points" when wet, making it necessary to process the photographic material at relatively low temperatures, i. e., on the order of 15 to 25° C.

Any gelatin substitute which would be free of the aforesaid disadvantages of gelatin would need to possess the gel-forming and protective colloid action of gelatin but with constant physical properties and chemical constitution. Such a material should be capable of bestowing on emulsions constant properties and should be superior to gelatin as a film-forming material and should not be attacked by bacteria or molds.

Considerable work has been done in the photographic field in an effort to supply a material which would possess the above properties and would serve as an effective gelatin substitute. Much of this work has been directed toward the preparation from polyvinyl alcohol of reversible gels by adding to the polyvinyl alcohol gelling agents.

Polyvinyl alcohol is a high molecular weight, water-soluble polymer which yields tough transparent films when its aqueous solutions are dried. It is readily available and the chemical and physical properties of any given grade are fairly constant. Commercially it is manufactured by hydrolyzing polyvinyl acetate partially or completely to give a variety of products. The term "polyvinyl alcohol" as herein used also includes water-soluble hydrolyzed polyvinyl esters having a polyvinyl ester content of less than 25%, the remainder being polyvinyl alcohol. The structure of a completely hydrolyzed polyvinyl ester may be represented by the following formula:

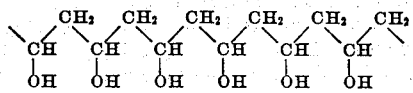

It will be noted from this formula that alternate carbon atoms are substituted by hydroxyl groups. It is to these hydroxyl groups that the water solubility of the product is attributable. There is interaction (hydrogen bonding) between these hydroxyl groups and water and between the hydroxyl groups of adjacent chains so that the solutions in water show an appreciable viscosity. Unfortunately, however, these forces are not sufficient per se to cause the product to gel on standing at room temperature or upon cooling.

Among the proposals to effect gelling of polyvinyl alcohol is that proposed in U. S. P. 2,249,537, which suggests the emploment of hydroxy aromatic amides, a typical example being N-2-naphthyl salicylamide of the formula:

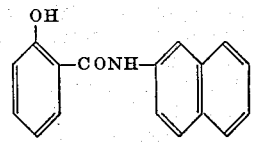

It will be observed that this compound contains two groups, an amide and the hydroxyl, which form strong hydrogen bonds with alcohols in general and with polyvinyl alcohol in particular. If the amide structure, which is ordinarily represented as $$-\overset{O}{\underset{\|}{C}}-NH-$$

is drawn in the form suggested by Sidgwick in "The Organic Chemistry of Nitrogen," Oxford, 1942, page 143

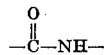

and the hydroxyl group as the ion—

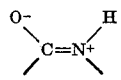

then the structure of polyvinyl alcohol gelled with such a hydroxy amide may be represented as:

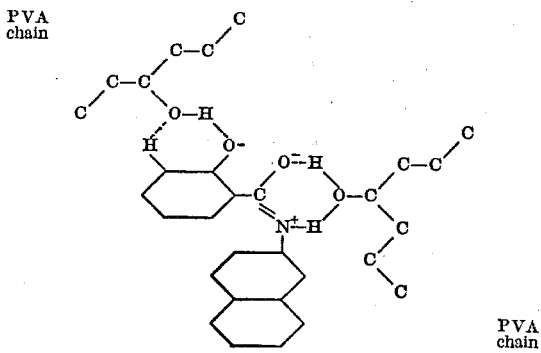

In this structure the hydrogen atoms of the polyvinyl alcohol hydroxyl groups are strongly attracted by the negative charge on the aromatic hydroxyl ions (negatively charged oxygens) and on the amide oxygens. The presence of aromatic structures on either side of the amide group apparently stabilizes the C=N form by conjugation with the double bonds in the rings.

I have now discovered that solutions of polyvinyl alcohol can be very effectively gelled by the use of 4,5-diphenyl-imidazolone-(2)-$x,x'$-disulfonic acid or the alkali metal salts thereof, i. e., compounds which do not have a ring hydroxyl group positioned ortho to an amide group and in which the amide group does not have aromatic structures on both sides thereof. Despite this fact, said compounds are particularly effective in causing the formation of reversible gels from aqueous polyvinyl alcohol, thus providing very effective substitutes for gelatin, particularly in the manufacture of photographic silver halide emulsions.

It is accordingly an object of the present invention to produce reversible gels of polyvinyl alcohol by adding 4,5-diphenyl-imidazolone-(2)-$x,x'$-disulfonic acid or the alkali metal salts thereof to an aqueous solution of polyvinyl alcohol.

It is a further object of the present invention to produce photographic silver halide emulsions containing as the colloidal binding agent a gel of polyvinyl alcohol containing 4,5-diphenyl-imidazolone-(2)-$x,x'$-disulfonic acid and the alkali metal salts thereof as the gelling agent.

Other and further important objects of the invention will become apparent as the description proceeds.

The structure of 4,5-diphenyl-imidazolone-(2)-$x,x'$-disulfonic acid may be portrayed as either:

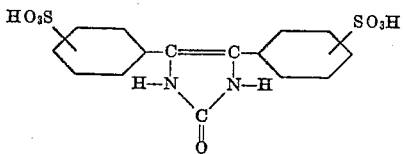

or

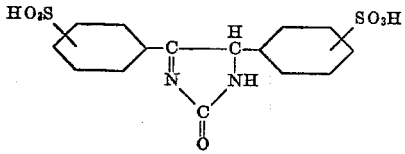

The above compound is substantive to cotton, that is, it has a high affinity for cotton and resists removal therefrom by washing treatments. It also has the unique characteristic of brightening or whitening white fabrics to which it is applied. In addition it is characterized by the property of fluorescing under ultraviolet light.

The product is prepared by sulfonating 4,5-diphenyl-imidazolone-(2)-(Beilstein, 4th edition, vol. XXIV, p. 211) by means of strong sulfuric acid by conventional methods (see Example 1 of German Patent 735,478).

The quantity of the gelling agent which is added will usually range from about 1 to 5% by weight of the polyvinyl alcohol. The polyvinyl alcohol found to be most effective is a water solution containing from about 7 to 10% of polyvinyl alcohol.

It should be emphasized that the gels produced when the above compounds are added to aqueous solutions of polyvinyl alcohol are thermally reversible, i. e., exist in the gel state at room temperature but become fluid upon heating, a behavior similar to aqueous solutions of gelatin. The "melting point" of these gels will vary with the amount of gelling agent used, the concentration of the polyvinyl alcohol solution used, and somewhat with the type of polyvinyl alcohol used. But in general gels prepared in the above described manner melt at temperatures above 40° C. and "set" to gels below that temperature. Such gels may therefore be conveniently prepared by mixing the polyvinyl alcohol solutions and gelling agents (added, for example, as a suitable aqueous solution) at some temperature above 40° C., such as 50° C., and stirring until a homogeneous fluid is obtained. Upon chilling to some temperature below 40° C., such as 25° C., such fluids rapidly set to stiff gels. Such gels may be rapidly "melted" by heating and "set" by chilling, illustrating their thermal reversibility. It should be understood that gels of much higher melting point, e. g., 75° C. may be prepared by employing the gelling agent in larger amounts.

4,5-diphenyl-imidazolone-(2)-$x,x'$-disulfonic acid is most effective as a gelling agent at a pH on the alkaline side. The alkalinity may be supplied by adding the gelling agent in the form of its alkali metal salt, such as the sodium or potassium salt. As is apparent from this, a great excess of alkali is not necessary and this is evident from the fact that the gels prepared with these gelling agents can be washed for many hours with a practically complete removal of all of the alkali originally added to dissolve the gelling agent. Once the gel, or an emulsion made with it, has been coated on a base, set and dried, it withstands either acid or alkali as well as conventional fixing agents.

Photographic emulsions may be prepared with the gelatin substitute hereof by adding a sodium halide to an aqueous solution of the desired polyvinyl alcohol, heating the solution to a temperature of about 40 to 60° C., and adding a water solution of a soluble silver salt while stirring. The fluid silver halide emulsion thus formed is stirred and the desired gelling agent solution containing a small amount of an alkali metal hydroxide, and preferably an inert solvent such as alcohol, dioxane, etc. are added over a period of minutes. The fluid emulsion is then stirred at a temperature within the above range in red light. After stirring to ripen the emulsion, it may be coated at once without washing on a desired paper base. The coating gels promptly as it cools and it is dried in the dark at room temperature.

Alternatively, the emulsion may be chilled, shredded and washed to remove sodium nitrate or other inorganic salts and re-melted for use in coating photographic film.

The following example will serve to illustrate the invention, but it is to be understood that this example is not limitative. The parts are by weight unless otherwise stated.

Example

The following solutions were utilized in the preparation of the emulsion.

*Solution 1.*—100 ml. of 10% solution of a medium viscosity completely hydrolyzed polyvinyl alcohol (Du Pont Elvanol 90-25).

*Solution 2.*—.9 gram of sodium chloride in 25 ml. of distilled water.

*Solution 3.*—1.875 grams of silver nitrate in 15 ml. of distilled water

*Solution 4.*—.4 gram of the di-sodium salt of 4,5 - diphenyl - imidazolone - (2)-$x,x'$-disulfonic acid, .2 ml. of 10% sodium hydroxide solution, 3 ml. of ethyl alcohol and 10 ml. of distilled water.

*Solution 5.*—1 ml. of 8% saponin solution.

Solution 1 was heated to 50° C. with stirring. Solution 2 was added and stirring was continued for 5 minutes. Solution 3 was added all at once in red light with stirring, the stirring being continued at 50° C. for 5 minutes. Solution 4 was added dropwise over a period of 5 minutes to avoid coagulation due to local high concentrations of the gelling agent. Stirring was continued for 5 minutes whereupon solution 5 was added and the mixture stirred for a further 5 minutes.

The emulsion so obtained was coated immediately without washing on baryta paper stock at 50° C. The emulsion set rapidly as it cooled and was finally dried at room temperature.

Prints are prepared on this paper in the usual manner by exposure under a negative and developing and fixing in standard reagents. The prints so produced have excellent almost sparkling whites, dense bluish blacks and a broad range of gradation. The whites are particularly clean due to the fact that the gelling agent employed has a brightening or whitening action as referred to above.

Instead of directly coating the emulsion, it may be gelled, shredded and washed to remove sodium nitrate or other inorganic salts and re-melted for use in coating photographic film. This serves to illustrate the thermo reversibility of the gels produced herein.

The emulsions prepared as above give photographic materials having satisfactory photographic properties and physical properties superior to emulsions prepared with gelatin. This is attributable in part to the fact that the polyvinyl alcohol forms tougher, less brittle layers than gelatin, is more uniform in composition, and is resistant to attack by bacteria and molds.

Another very important consideration dictating the utilization of the emulsions contemplated herein is the fact that the polyvinyl alcohol is much less expensive than gelatin. Finally, because of the ability of the gelling agent to act as brightening or whitening agents, the images produced by the use of the gels in photographic emulsions yield very bright and clean whites.

It should be understood that the gels formed by the addition of a gelling amount of the 4,5-diphenyl-imidazolone-(2)-$x,x'$ - disulfonic acid and the alkali-metal salt thereof to polyvinyl alcohol solutions can be used for purposes other than the preparation of photographic products. Such gels may be employed, for example, as thickening and gelling agents in cosmetic compositions, water paints, printing inks, and many other applications where thickening or gelling compositions are required.

Various modifications of the invention will occur to persons skilled in the art. For instance, it is evident that in lieu of using sodium chloride in the above examples to produce silver chloride emulsions, potassium bromide may be used for the production of silver bromide emulsions. I therefore do not intend to be limited in the patent granted except as necessitated by the appended claims.

I claim:

1. A thermo reversible gel composed of water, and polyvinyl alcohol mixed with a gelling amount of a substance selected from the class consisting of 4,5-diphenyl-imidazolone-(2)-$x,x'$-disulfonic acid and the alkali metal salts thereof.

2. A thermo reversible gel composed of water, and polyvinyl alcohol mixed with a gelling amount of the disodium salt 4,5-diphenyl-imidazolone-(2)-$x,x'$-disulfonic acid.

3. A method of preparing a thermo reversible gel which comprises mixing an aqueous solution of polyvinyl alcohol with an aqueous alkaline solution of substance selected from the class consisting of 4,5-diphenyl-imidazolone-(2)-$x,x'$-disulfonic acid and the alkali metal salts thereof in a gelling amount at a temperature at which the mixture retains its liquid form and subsequently lowering the temperature to a point at which the formation of a gel occurs.

4. The process as defined in claim 3 in which the gelling agent is used in an amount ranging from about 1 to 5% by weight of the polyvinyl alcohol.

DONALD E. SARGENT.

REFERENCES CITED

The following references are of record in the file of this patent:

UNITED STATES PATENTS

| Number | Name | Date |
|---|---|---|
| 2,249,537 | McDowell et al. | July 15, 1941 |